United States Patent [19]

Komine

[11] Patent Number: 4,717,842
[45] Date of Patent: Jan. 5, 1988

[54] MODE-MATCHED LASER/RAMAN COUPLED UNSTABLED RESONATORS

[75] Inventor: Hiroshi Komine, Torrance, Calif.

[73] Assignee: Northrop Corporation, Hawthorne, Calif.

[21] Appl. No.: 821,647

[22] Filed: Jan. 23, 1986

[51] Int. Cl.$^4$ .............................. G02F 1/35; H01S 3/30
[52] U.S. Cl. ........................................ 307/426; 372/3; 372/95
[58] Field of Search .................... 307/426; 372/3, 95, 372/71, 92, 57, 99

[56] References Cited

U.S. PATENT DOCUMENTS 4,490,823  12/1984  Komine et al. ................. 372/95
4,618,783  10/1986  Pradere et al. .................. 372/3

FOREIGN PATENT DOCUMENTS 8602784  5/1986  PCT Int'l Appl. .................. 372/3

Primary Examiner—James W. Davie
Attorney, Agent, or Firm—Terry J. Anderson; Robert B. Block

[57] ABSTRACT

A device utilizing lasers wherein efficient wavelength shifting of the generated laser radiation is provided using stimulated Raman scattering both in atomic vapor and molecular media. A coupled pair of confocal unstable resonators in conjuction with an integral injection laser is utilized in a novel optical arrangement for providing the efficient conversion of laser power into Stokes radiation without beam obscurations. The wavelength, spectral bandwidth, polarization and beam divergence are controlled by the spatial evolution of the main laser output which is locked to the seed radiation provided along the optical axis by the injection laser. Mode matching of the wavefront is automatically achieved by the use of common optical surfaces which couple the injection laser, main laser and the Raman converter. The resulting Stokes output through a partially reflecting/transmitting mirror is an unobscured beam whose intensity profile is determined by the laser medium power distribution.

14 Claims, 3 Drawing Figures

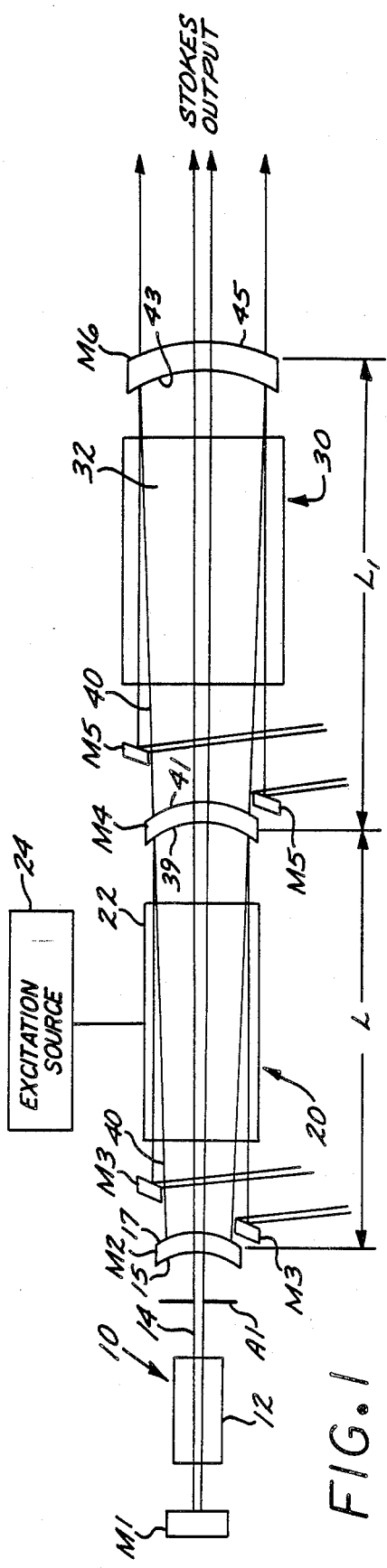
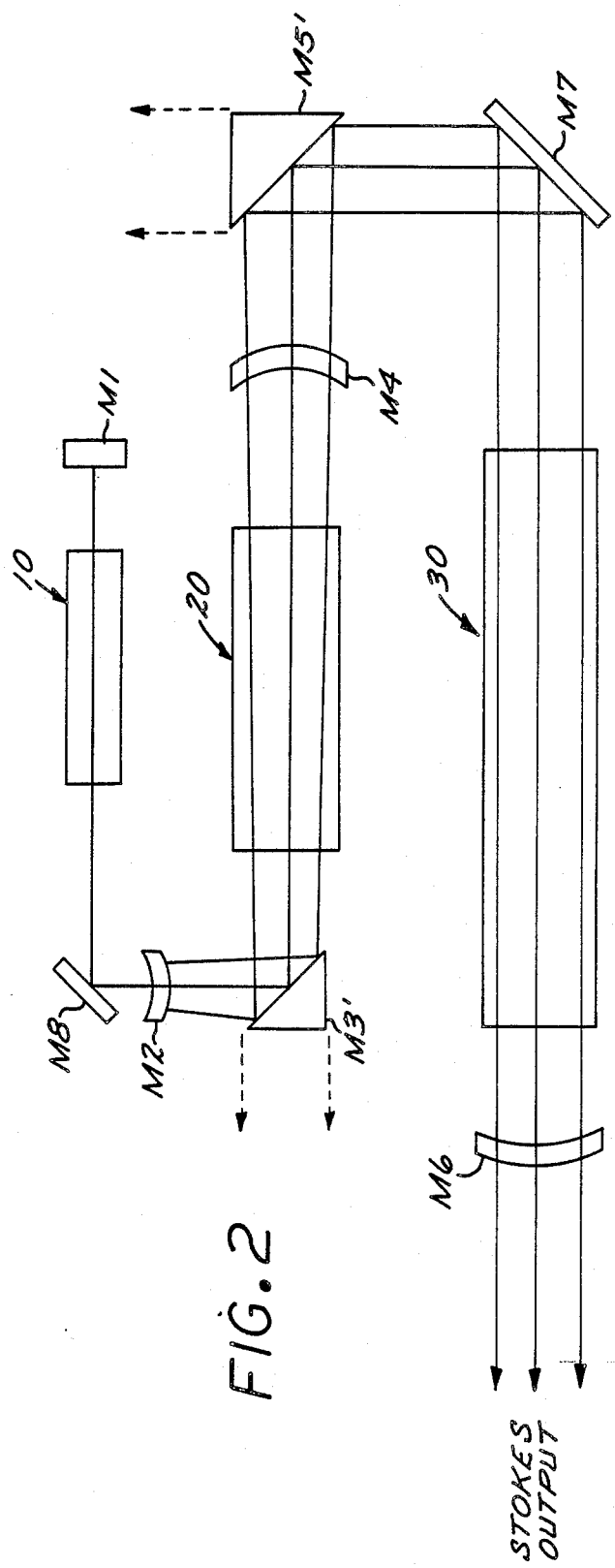

FIG. 3

| OPTIC \ COATING | $M_2$ | $M_4$ | $M_6$ |
|---|---|---|---|
| CONCAVE SURFACE | R<0.2% @ $\lambda_{laser}$ (SURFACE 15) | R=30-70% @ $\lambda_{laser}$ R>99% @ $\lambda_{stokes}$ (SURFACE 39) | R<0.2% @ $\lambda_{laser}$ R=5-20% @ $\lambda_{stokes}$ (SURFACE 43) |
| CONVEX SURFACE | R=95-99% @ $\lambda_{laser}$ (SURFACE 17) | R<0.2% @ $\lambda_{laser}$ R<0.2% @ $\lambda_{stokes}$ (SURFACE 41) | R<0.2% @ $\lambda_{laser}$ R<0.2% @ $\lambda_{stokes}$ (SURFACE 45) |

MODE-MATCHED LASER/RAMAN COUPLED UNSTABLED RESONATORS

BACKGROUND OF THE INVENTION

1. Field of the Invention

The present invention relates to the attainment of efficient shifting of laser radiation using stimulated Raman scattering in atomic vapor and molecular media, the control of the generated beam quality spectral bandwidth as well as scaling to larger energies and power levels being accomplished using coupled, unstable resonators consisting of partially transmissive optics. This results in a sequence of laser and Stokes radiation amplification which results in high conversion efficiency and a beam output with low divergence.

2. Description of the Prior Art

Attainment of efficient wavelength shifting of laser radiation has been widely demonstrated using stimulated Raman scattering in atomic vapor and molecular media. However, control of the generated beam quality and spectral bandwidth as well as scaling to the larger energy and power levels have required the use of sophisticated optical configurations such as master-oscillator/power amplifiers and unstable resonators. Prior art disclosures relating to master-oscillator/power amplifiers are disclosed for example in the article by Komine et al "Efficient Higher-Stokes-Order Raman Conversion in Molecular Gases", Opt. Lett. 4, 398 (1979); Komine et al, Higher-Stokes-Order Raman Conversion of XeCl Laser in Hydrogen, Opt. Lett. 7, 157 (1981); Komine et al, "Efficient H Raman Conversion of Long-Pulse XeF Laser Radiation into Blue-Green Region", Appl. Phys. Lett. 4, 551 (1980) and U.S. Pat. No. 4,280,109. Typical of the prior art describing unstable resonators providing the above features is described in the article by Woods et al, "Aperture Combined Raman Laser", AIP Conference Proceedings No. 100, Series on Optical Science and Engineering No. 3, Excimer Laser-1983, p. 200 (1983).

In a number of applications requiring a specific laser frequency, it is required that the output beam from the Raman converter have a uniform intensity profile and low divergence using a minimum number of optical components. Raman converter optical configurations using a master-oscillator/power amplifier technique satisfy the beam profile and divergence requirements, but generally require many optical elements to achieve the necessary beam sizes and intensity levels for optimum performance. Unstable resonators formed by a pair of reflective mirrors for the Stokes radiation provide a more simplified optical cavity design; however, an off-axis pumping geometry is normally needed to couple the laser radiation into the Raman resonator cavity. The disadvantages to this approach is that such off-axis pumping geometry imposes a very stringent narrow spectral bandwidth requirement on the laser radiation which may be difficult to achieve in particular lasers.

Furthermore, the output provided by the unstable resonators is partially obscured resulting in an irregular shaped beam or a beam with a hole inside.

What is desired therefore is to provide a device for shifting the wavelength of laser radiation using stimulated Raman scattering in atomic vapor and molecular media wherein the beam intensity profile is substantially uniform, and the beam divergence is low, the device providing relatively high conversion efficiency in addition to using a minimum number of optical elements to achieve the necessary beam sizes and intensity levels for optimum performance.

SUMMARY OF THE PRESENT INVENTION

The present invention provides a device for efficient wavelength shifting of laser radiation using stimulated Raman scattering in atomic vapor and molecular media without the aforementioned disadvantages of the master-oscillator/power amplifier and unstable resonator configurations while retaining the desireable features of each. In particular, the laser and Stokes output beams are generated without obscuration (e.g., rectangular, square, or circular shaped beams) using unstable resonators consisting of partially transmissive optics. The transverse mode formation in each resonator containing the laser and Raman gain medium is initiated by an injection laser which also controls the wavelength tuning and spectral bandwidth as well as polarization of the laser and Stokes output beams. The combination of these elements (under appropriate conditions of gain and feedback) yields a sequence of laser and Stokes radiation amplification which results in high conversion efficiency and low divergence beam output.

Thus the present invention provides a device incorporating laser/Raman unstable resonators coupled in a manner to provide wavelength shifting of laser radiation using stimulated Raman scattering in either atomic vapor or molecular media. The shifting is accomplished at high efficiency and the beam output has a substantailly uniform intensity profile and a low divergence. The device utilizes a minimum of optical components thus substantially reducing the cost and complexity of the device.

BRIEF DESCRIPTION OF THE DRAWINGS

For better understanding of the invention, as well as further features and objects thereof, reference is made to the following description which is to be read in conjunction with the accompanying drawing wherein;

FIG. 1 is an optical schematic of the preferred embodiment of the present invention;

FIG. 2 illustrates an alternate optical schematic of the present invention; and

FIG. 3 illustrates typical optical coating requirements for the optics used in the embodiments of FIG. 1 and 2.

DETAILED DESCRIPTION OF THE INVENTION

Referring now to FIG. 1, an optical schematic illustrating the principles of the present invention is set forth. The device shown in FIG. 1 comprises a plurality of optical resonators, injection laser 10, the main laser 20 and the Raman converter 30. Injection laser 10, main laser 20 and Raman converter 30 are mutually coupled via common optical elements, described hereinafer, that are functionally shared by the respective optical resonators.

Injection laser 10 consists of a laser medium 12 contained inside a stable resonator mode cavity formed by optics M1 and M2 and aperature A1. Laser medium 12 may comprise a rare gas halide, such as XeCl, KrCl, KrF or XeF; solid state material such as a Nd: YAG crystal or a visible gas such as HgBr or $S_2$ (sulphur dimer). M2 is a partial reflector which transmits the power from injection laser 10 into the cavity of main laser 20 as a $TEM_{00}$ mode beam. As is well known in the laser art, M1 comprises a set of optics that control the output wavelength, spectral bandwidth and polarization of the beam 14 passing through aperture A1. Typically, optics M1 comprise prisms, grating, etalons (an optical element which is used to reduce the laser output bandwidth), etc.

The main laser 20 consists of a laser medium 22 contained inside an unstable resonator cavity formed by optics M2, M3 and M4. Typically laser media 22 is the same as laser medium 12 although different laser media can be utilized as long as the same laser frequencies are emitted. The curvatures and spacing of M2 and M4 are selected, as set forth hereinafter, so as to form a positive branch confocal unstable resonator (provides a collimated wave travelling away from optic M4). M3 is a conventional scraper mirror which reflects a fraction of laser power incident thereon generated by the laser medium 22. M4 is partial reflector which transmits an unobscured laser beam into the Raman converter cavity 32.

The radiation inside the unstable resonator 20 grows from the "seed" radiation provided by the output beam 14 generated by injection laser 10. The seed beam has the exact wavefront curvature for an expanding beam inside the unstable resonator 20 (i.e., mode-matched) since medium 22 is selected such that the seed radiation matches the natural resonance of optical resonator 20. The seeded radiation is the only radiation capable of growing to large intensity levels due to the mirror curvatures and spacing. The seed radiation is left on long enough so that multiple passes occur to fill up the resonator cavity with light, each round trip of the beam magnifying the beam and amplifying its intensity. Thus, the output beam 40 through M4 is a $TEM_{oo}$ mode initially and subsequently enlarges to a size limited by the scraper mirror M3 and/or laser gain medium aperture (not shown). This intensity growth from the injected seed radiation permits the control of the output wavelength spectral bandwidth and polarization characteristics generated by the unstable resonator 20.

The beam divergence is essentially governed by the magnified and amplified seed beam which experiences saturated gain thus enabling efficient laser power extraction. This sequence of controlled amplification results from a proper timing of the excitation of main laser 20 relative to the excitation of injection laser 10. A basic requirement for this timing is such that the injection seed beam 14 makes its initial round trip inside the unstable resonator cavity 20 no later than the start of the main laser excitation provided by excitation source 24. A second requirement, as noted above, is that the seed radiation is sufficiently long in order for the magnified beams (seeded radiation) to fill up the unstable resonator mode volume i.e. the spatial extent of the beams in cavity 20.

The Raman converter 30 consists of a Raman cell, or medium, 32 contained inside an unstable resonator cavity formed by optics M4, M5, and M6. Medium 32 typically comprises atomic lead vapor or thallium vapor, and hydrogen, methane or deuterium if the medium is selected to be molecular. The curvatures and spacing of M4 and M6 (set forth hereinafter with reference to FIG. 3) are selected so as to form a positive branch confocal unstable resonator by selecting the proper mirror curvatures and resonator length. M6 is a partial reflector which transmits the output Stokes beam. Since M4 is common to both the main laser 20 and the Raman converter 30, the wavefront of the main laser output matches the expanding wave of the Stokes radiation inside the Raman unstable resonator 30 thus increasing the conversion efficiency over prior art systems.

The Stokes radiation grows from spontaneously scattered radiation near the resonator axis as a result of the spatial evolution of the main laser beam 40 from the seeding beam 14. Since the main laser beam 40 starts from the amplifier $TEM_{oo}$ mode from the seed beam, the Raman oscillation occurs initially along the $TEM_{oo}$ mode direction. This build-up of the Stokes wave is analogous to the oscillator portion of the prior art Raman master-oscillator/power amplifier configuration in which a low power Stokes beam is generated with a near-unity Fresnel number pump geometry. Whereas the prior art configuration requires a separate beam expander for amplifiier injection, the unstable resonator 20 automatically expands the internally generated Stokes seed beam.

Raman amplification and conversion of the laser power into (typically a single order) Stokes radiation occurs as the Stokes seed beam is magnified to the full aperture determined by the laser beam 40 and/or Raman resonator scraper mirror M5. For Raman media with significant forward to backward gain asymmetry, the forward expanding wave is amplified substantially more than the collimated backward wave in the present invention. This results in low conversion efficiencies for the collimated wave, and consequently the output of scraper mirror M5 represents a relatively small portion of the overall Stokes power. The remaining portion not taken out by the scraper mirror M5 provides a feedback expanding wave upon reflection from the convex surface 41 of M4. Thus matching the mode of the output of resonator 20 (pump beam) to the expanding forward Stokes wave and transmitting the output through the partial transmissive mirror M6 provides a novel optical geometry which optimizes the conversion efficiency of an unobscured Stokes output beam.

An additional constraint placed on the coupled unstable resonators is the cavity length matching of the two resonators to within the temporal coherence length of the laser radiation. This condition arises from a need to maximize the Raman gain by temporal correlation of the laser and the Stokes radiation inside the Raman resonator. In practice, this constraint may be satisfied by narrowing the spectral bandwidth of beam 14 or selecting a Raman resonator length $L_1$ which is an integral multiple of the laser resonator length L. Typically, the latter constraint is used with $L_1$ being selected to equal L.

Regarding the optical design requirements of the system shown in FIG. 1, the general specifications for the design of coupled unstable resonator optics includes substrate material and size, radius of curvature, coating on the surface, and scraper design. Each of these requirements is briefly described below.

A basic requirement for these optics is their transparency at the laser, and the Raman shifted Stokes wavelengths. For the UV excimer and visible lasers noted previously, this requirement can be met by commercially available UV grade fused silica substrates which have low absorption values. These materials can be polished to low rms roughness and good surface figure which are necessary for minimizing optical scattering and beam aberrations, respectively.

The radii of curvature of the optics are determined by the optical cavity length needed to enclose the laser/Raman gain media and by the unstable resonator magnification (knowing the medium gain and feedback requirements necessary to sustain Raman oscillation establishes the resonator magnification). For a confocal case the ratio of the radius of the concave surface to the convex surface is given by the magnification. Since the scraper losses are preferably minimized in the present invention, low magnification values, M, are used. The values may range from a low of 1.05 to 1.15, to a maximum value of approximately 2.

The optical coating requirements on the unstable resonator optics are dependent on the gain value in the laser and Raman media. For typical UV excimer laser media and Raman media, such as hydrogen gas and lead vapor, representative values of coating reflectivities R are set forth in FIG. 3. ($\lambda$ laser=wavelength of laser; $\lambda$ Stokes=wavelength of Stokes).

The shape of the resonator optics is assumed to be miniscus with the two surfaces having the same radius of curvature as illustrated in FIG. 1. Other shapes are possible as long as refractive effects are properly taken into account. If the radius of curvature of the optics M2, M4 and M6 are denoted by $R_2$, $R_4$, and $R_6$, respectively, the relationships among the radii are given by $$R_4/R_2 = M_{laser} \text{ and } R_6/R_4 = M_{Raman}$$

where $M_{laser}$ and $M_{Raman}$ are the magnifications for the cavities of laser 20 and Raman converter 30, respectively. The resonator lengths required for the positive branch confocal unstable resonators 20 and 30 are given by $$L = (R_4 - R_2)/2 \text{ and } L_1 = (R_6 - R_4)/2$$

where L and $L_1$ must exceed the respective gain medium lengths. These relations may be combined to yield the following design formulas $$L_1/L = M_{laser}(M_{Raman} - 1)/(M_{laser} - 1)$$

$$R_2 = 2L/(M_{laser} - 1)$$

$$R_4 = 2L/(M_{Raman} - 1)$$

$$R_6 = 2M_{Raman} L_1/(M_{Raman} - 1)$$

A range of approximate values of resonator lengths and magnifications for the embodiment shown in FIG. 1 are as follows:

$L_1 = 1$ to 3 meters $M_{Raman} = 1.1$ to 2

$L = 1$ to 3 meters
$M_{laser} = 1.1$ to 2

The scrapers in this invention provide a means for limiting the resonator mode and preventing unwanted feedback once the mode size is established. Beams taken out via scrapers M3 and M5 are not used directly as useful power extraction. However, such beams may be useful as diagnostic or resonator alignment guides. The shape of the scraper for this purpose may be reflective or transmissive, depending on the geometry of the laser and Raman media. Reflective scrapers with a hole may be used in a colinear geometry in which the laser and Raman media are arranged in tandem along the optical exis as depicted in FIG. 1 which is the preferable embodiment of the present invention. Transmissive scrapers may be used in configurations where the laser and Raman media are arranged in parallel, as shown in FIG. 2 which illustrates an alternate arrangement of the device shown in FIG. 1 (components having the same reference numerals in each figure are identical notwithstanding the fact that the components in FIG. 2 are not drawn to the same scale as the device components shown in FIG. 1.) In this figure M3' and M5' represent transmissive scrapers which reflect the desired resonator mode but passes the unwanted outer portion of the collimated feedback beam. Additional turning mirrors, M7 and M8, are included in FIG. 2 for directing the beams in this arrangement. The operation of the device shown in FIG. 2 is essentially identical to that described with reference to FIG. 1 except for the functions of scrapers M3' and M5' and mirror M7 and M8 described hereinabove.

In summary, coupled, confocal unstable resonators 20 and 30 with an integral injection laser 10 provides a novel device for efficiently converting laser power into Stokes radiation without beam obscurations. The wavelength, spectral bandwidth, polarization, and beam divergence of the output Stokes beam are controlled by the spatial evolution of the main laser 20 output which in turn is controlled by the seed radiation provided along the optical axis by the injection laser 10. Mode matching of the wavefront is automatically achieved by the use of common optical surfaces which couple the injection laser 10, main laser 20 and the Raman converter 30. to provide for relatively large conversion efficiencies (i.e. power/energy of shifted light/Stokes output divided by power/energy of laser beam 40) typically in the range of 50%. This arrangement leads to the generation of the Stokes output while power conversion is achieved with feedback amplification of the forward expanding Stokes wave with a large Fresnel number. The resulting Stokes output through a partially reflecting/transmitting mirror M is an unobscured beam whose intensity profile is determined by the laser medium 20 power distribution. Thus, a substantially uniform laser medium 22, under saturated amplification, can provide a similarly uniform intensity Stokes output. These features of the Raman converter retain the advantages of the master oscillator/power amplifier configuration while the shared, partially transmissive unstable resonator optics reduced the number of optics to a minimum. In the embodiment shown in FIG. 1, six optics are used whereas the prior art master-oscillator power amplifier arrangement typically utilizes twice that number of optics. The minimized optical train enables the laser wavelength shifting device of the present invention to have a reduced size and weight, increased reliability and lower cost, critical factors in the device design.

While the invention has been described with reference to its preferred embodiments, it should be understood by those skilled in the art the various changed may be made and may be substituted for elements thereof without departing from the true spirit and scope of the invention. In addition, many modifications may be made to adapt a particular situation or material to the teachings of the invention without departing from its essential teachings.

What is claimed is:

1. A device having an optical axis utilizing Stokes-Raman scattering for converting a beam of radiation from a laser into Stokes radiation at another frequency comprising:

first laser means aligned along said optical axis for generating a first beam of a first frequency, said first laser means having a first optic member for transmitting a substantial portion of said first radiation beam along said optical axis;

an unstable resonator aligned along said optical axis and comprising a laser medium capable of supporting radiation of said first frequency, the output of said first laser means being injected into said unstable resonator through said first optic member, siad first optic member and a second optic member and said laser medium comprising said unstable resonator; and a Raman converter aligned along said optical axis and positioned to receive amplified radiation generated by said unstable resonator, said Raman converter comprising a Raman medium, said second optic member positioned on one side of said Raman medium and a third optic member positioned on the other side of said Raman medium, said third optic member transmitting said Stokes radiation.

2. The device of claim 1 wherein said first beam passes through said Raman converter in a forward direction along said optical axis.

3. The device of claim 2 wherein the injected radiation is amplified in said unstable resonator, the amplified radiation being directed through the Raman medium to provide a Stokes beam which spatially coincides with said first radiation beam passing through said Raman medium, the output radiation transmitted through said third optic member having a frequency less than said first frequency.

4. The device of claim 1 wherein said second laser medium and said first and second optic members are selected such that curvatures of said first and second optic members and the length therebetween form a positive branch confocal unstable resonator.

5. The device of claim 4 wherein said Raman medium and said second and third optic members are selected such that the curvatures of said second and third optic members and the length therebetween from a positive branch confocal unstable resonator.

6. The device from claim 1 wherein said first laser means and said unstable resonator comprise excimer lasers.

7. The device of claim 1 further including scraper mirror means positioned between said first optic member and the laser medium within said unstable resonator to limit the extent of the laser radiation beam size by rejecting the outer portions of the beam.

8. The device of claim 7 further including a scraper mirror means positioned between said second optic member and said Raman medium to limit the extent of the Raman Stokes radiation beam size by rejecting the outer portions of the beam.

9. The device of claim 1 wherein the wavefront of the output beam from said unstable resonator matches the wavefront of the expanding wave of the Stokes radiation inside said Raman converter.

10. The device of claim 1 wherein the radiation injected into said unstable resonator is applied for a time period to allow the seeded radiation to fill up the spatial extent of said unstable resonator.

11. The device of claim 10 wherein the injected radiation beam makes its initial round trip inside said unstable resonator prior to initiating the excitation of said unstable resonator.

12. The device of claim 1 wherein said first, second and third optic members comprise meniscus shaped surface.

13. The device of claim 1 wherein the output transmitted by said third optic is an unobscured beam.

14. The device of claim 1 wherein the output beam transmitted by said third optic is of substantially uniform intensity.

* * * * *